(12) United States Patent
Bodle (10) Patent No.: US 6,276,634 B1
(45) Date of Patent: *Aug. 21, 2001

(54) EMERGENCY LIGHTING

(75) Inventor: Peter Winstanley Bodle, Narborough (GB)

(73) Assignee: SAF-T-GLO Limited, Narborough (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/364,611

(22) Filed: Jul. 29, 1999

Related U.S. Application Data (63) Continuation of application No. 08/519,426, filed on Aug. 25, 1995, now Pat. No. 5,961,072.

(30) Foreign Application Priority Data

Apr. 20, 1995 (GB) .................................................. 9508065

(51) Int. Cl.[7] .................................................. B64D 11/00
(52) U.S. Cl. .......................... 244/118.5; 40/542; 40/570; 362/84; 362/153
(58) Field of Search ................................ 52/174, 177, 33; 40/542, 570; 362/153, 84; 116/205, DIG. 16; 404/9, 14, 15, 16; 244/118.5, 118.6

(56) References Cited

U.S. PATENT DOCUMENTS

| | | | |
|---|---|---|---|
| 1,860,685 | 5/1932 | Morris | 40/217 X |
| 2,341,583 | 2/1944 | Tuve | 40/542 X |
| 2,654,971 | 10/1953 | Harrison | 40/542 |
| 2,709,863 | 6/1955 | Bevacqua | 40/206 |
| 2,949,303 | 8/1960 | Sherman | 362/153 X |
| 3,408,025 | 10/1968 | Davis | 52/174 X |
| 3,591,942 | 7/1971 | Van Swearingen | 40/542 X |
| 3,936,207 | 2/1976 | Sticha | 404/14 |
| 4,347,499 | 8/1982 | Burkman, Sr. et al. | 362/153 X |
| 4,385,586 | 5/1983 | Schriever | 52/174 X |
| 4,401,050 * | 8/1983 | Britt et al. | 40/542 X |
| 4,794,373 | 12/1988 | Harrison | 362/153 X |
| 4,998,391 * | 3/1991 | Connew | 52/179 |
| 5,270,100 | 12/1993 | Giglio | 40/542 X |
| 5,279,058 | 1/1994 | Kohn | 40/638 |
| 5,331,918 | 7/1994 | Honigsbaum | 116/205 |
| 5,376,303 | 12/1994 | Royce et al. | 252/301.4 R |
| 5,411,784 | 5/1995 | Brewster | 40/594 X |
| 5,424,006 * | 6/1995 | Murayama et al. | 252/301.4 R |
| 5,499,170 | 3/1996 | Gagne | 362/153 X |
| 5,686,022 | 11/1997 | Murayama et al. | 252/351.4 R |
| 5,724,909 | 3/1998 | Pitman et al. | 116/202 |
| 5,775,016 | 7/1998 | Chien | 40/544 |
| 5,839,718 * | 11/1998 | Hase et al. | 252/301.4 F |
| 5,853,614 | 12/1998 | Hao et al. | 252/301.4 R |
| 5,904,017 * | 5/1999 | Glatz et al. | 52/287.1 |
| 5,961,072 * | 10/1999 | Bodle | 244/118.5 |
| 6,044,598 * | 4/2000 | Elsasser et al. | 52/181 |

FOREIGN PATENT DOCUMENTS

| | | | |
|---|---|---|---|
| 0 489 561 | 6/1992 | (EP) . | |
| 964348 | 8/1950 | (FR) . | |
| 2308155 | 11/1976 | (FR) . | |
| 2224154 | 4/1990 | (GB) | 116/205 |
| 87/02813 | 5/1987 | (WO) . | |
| 93/14422 | 7/1993 | (WO) . | |
| 94/16287 | 7/1994 | (WO) . | |
| 94/17766 | 8/1994 | (WO) . | |

* cited by examiner

*Primary Examiner*—Anthony Knight
*Assistant Examiner*—Andrea Chop
(74) *Attorney, Agent, or Firm*—Ronald M. Anderson (57) ABSTRACT

An emergency lighting system for an aircraft has photoluminescent strips mounted on the floor rather than a string of electrical lights. This is a better fail-safe since there is no possibility of a failure in power supply. A channel extrusion is secured to the floor of the aircraft and a photoluminescent strip is held between the channel and a transparent cover member. The photoluminescent strip has two thin layers of photoluminescent material rather on a base layer, rather than being a calendered product. This increases the light output.

21 Claims, 4 Drawing Sheets

EMERGENCY LIGHTING

RELATED APPLICATION

This application is a continuation of a prior patent application, U.S. Ser. No. 08/519,426, filed Aug. 25, 1995, and issued as U.S. Pat. No. 5,961,072 on Oct. 5, 1999, the benefit of the filing date of which is hereby claimed under 35 U.S.C. § 120.

FIELD OF THE INVENTION

This invention relates to emergency lighting, typically for the interior of vehicles, and especially, but not exclusively, to emergency exit floor path lighting for aircraft.

BACKGROUND OF THE INVENTION

It is well known in aircraft to have strips of electrical lights mounted at floor level to guide passengers to the emergency exit doors of the aircraft. The strips of electric lights are powered by an emergency battery. Such systems work well, but they have some problems.

One problem is that they need regular servicing. The electrics needs checking periodically and bulbs need replacing. Maintenance of the floor-level emergency exit lights adds significantly to the cost of maintaining an aircraft. Also the power drain caused by running the lights adds to fuel costs.

A further problem is that if the emergency battery fails there is no guide lighting for the passengers leading them to the exits.

Another problem is that in the event of a crash the electrical wires connecting some or all of the floor level emergency lights can be broken, again meaning that some or all of the floor-level emergency lights are inoperative at just the time that they are most needed.

It is an aim of one embodiment of the present invention to alleviate at least some of these problems.

SUMMARY OF THE INVENTION

According to a first aspect of the invention we provide an emergency exit path lighting system comprising photoluminescent guide means adapted to indicate to a user a path for movement by emitting light photoluminescently.

Thus there is no external power supply to fail and thus the system may be fail safe. The system requires little or no special maintenance, and may simply require wiping or other similar cleaning. The system may be significantly lighter, cheaper and simpler to install than previous systems.

Preferably the guide means is on the floor, but may be elsewhere (e.g., on the side of seats).

Preferably the guide means is an elongate member.

Preferably the guide means comprises at least one, and preferably two elongate photoluminescent tracks mounted on or near the floor. The two photoluminescent tracks are preferably spaced apart so as to define a path within which the user should move. Each track preferably comprises a substantially continuous, or effectively continuous, strip of photoluminescent material. Alternatively a guide track may have photoluminescent regions, and non-photoluminescent regions which alternate. In a further alternative the photoluminescent track may comprise a row of photoluminescent dots, circles or the like.

Preferably the substantially continuous track provides a substantially continuous path of light from any point to an emergency exit. An advantage of this is that a person will never be lost as they will always have a path, to an exit, to follow. This "continuous cueing" concept is applicable to other situations.

Alternatively the substantially continuous track may provide a substantially continuous path of light from any point to the region of the emergency exit and electrical lighting means may provide lighting in the region of the emergency exit.

Preferably the system has a track which has a transparent or translucent cover which overlays a photoluminescent guide member. The photoluminescent guide member is preferably a relatively thin strip of material that is supported on a support member. The track may comprise a base member adapted to be secured to the floor, a cover member adapted to be releasably secured to the base member, and a photoluminescent member adapted to be sandwiched between the base member and the cover member. Preferably the photoluminescent member is a flexible strip. In one embodiment the support member supports the photoluminescent strip so that it can withstand being trodden upon. The support member preferably extends across substantially the full width of the photoluminescent strip. The photoluminescent member is preferably removable from the track and is replaceable. A track may be made of adjacent discrete lengths of profiled extrusion. The photoluminescent strip may also be provided in discrete lengths.

Alternatively, the photoluminescent strip may be permanently secured, for example with glue to either, the cover or the support member. In a further embodiment the photoluminescent strip may be co-extruded with either, or both, the cover, or the support member.

The cover member may have a ramped, or sloping, upper surface to facilitate the passage of wheeled vehicles such as trolleys.

Alternatively the cover member may have a low profile so that it provides only a minimal obstruction for wheeled vehicles, such as trolleys.

Preferably the track is laid in short sections. This has several advantages over using a continuous run of track. One advantage is that short runs are not as awkward to handle, another is that they are more resilient in the event of a crash of the vehicle in which the tracks are mounted. A continuous run may tend to be dragged away from the body of the vehicle in such a crash.

Alternatively the track may be laid in a continuous section.

Preferably the cover member of one section may overlap the base member of a neighboring section. An advantage of this is that neighboring sections are loosely coupled. A clip may be provided over the joints between the sections of the covering members. Alternatively the sections of the covering members may have no clip and simply butt against a neighboring section.

Preferably at each end of the track run there are provided end caps. The end caps may be used between the short sections of track.

Preferably to form angled joints the tracks are laid against each other. The sections may be mitered to form an angled joint.

Preferably a layer which is impervious to UV light is used to protect the photolurninescent layer. The UV protecting layer may be a strip mounted on top of the photoluminescent strip or may be a coating on the photoluminescent strip. An advantage of this is that UV light is prevented from reaching the photolurninescent strip, and thus the photoluminescent strip is not degraded by UV light. Also such a layer might additionally, or alternatively, prevent UV light from being emitted from the photoluminescent layer.

Preferably the layer impervious to UV light is made from a PVC based material or resin, but may be from any other suitable material. Preferably the layer impervious to UV light is translucent to light, or other electromagnetic radiation, other than UV light.

The transparent or translucent cover may have portions which are stained, painted, dyed or otherwise modified to change the light transmission properties of the cover. Preferably these portions are opaque. An advantage of such opaque portions is that they can be used to cover or mask poor cutting of the carpet. Alternatively the portions may not be opaque and may used to change the color of the light emitted from the photoluminescent strip. The method of modifying the light transmission properties may include inserting a colored filter underneath the cover or may include using a UV protective layer which modifies the color of the light passing through it.

According to a second aspect of the invention we provide a photoluminescent member comprising a base and a layer of photoluminescent material.

The layer may be cast onto the base. Alternatively, we may calender a thin layer, and apply that to the base.

Previously photoluminescent members have been made by mixing photoluminescent material with structural material and producing a calendered product. This has the photoluminescent material spread out throughout the depth of the member, when it is only needed at the surface. We have appreciated that by casting a photoluminescent layer on top of a base (or by having a thin calendered layer on top of a base) we can achieve better results.

Furthermore, we preferably provide (e.g. cast) two layers, or more, of photoluminescent material onto a base. This has been found to increase the light emitted, and is easier and cheaper than casting one thick layer. We can control the application of a thin layer better than the application of a thick layer, and so would prefer to provide (e.g. cast) a plurality of thin layers until we have the thickness (or light-emitting properties) we want.

The photoluminescent layer, or layers, is preferably a vinyl layer. The base preferably contains titanium dioxide but may contain other whitening agents. This is believed to capture light to energize the photoluminescent material.

The layers may be co-extruded instead of being cast together. We may co-extrude a base and a photolumninescent layer.

According to a third aspect of the invention we provide a method of manufacturing a photoluminescent article comprising applying (e.g. casting) a photoluminescent layer onto a base.

According to a fourth aspect of the invention we provide an aircraft having an emergency exit floor path lighting system in accordance with the first aspect of the invention.

Preferably the aircraft has a substantially continuous track mounted on or at the floor, the track comprising the photoluminescent guide means. Alternatively the photoluminescent guide means may be provided on the seats of the aircraft.

Preferably there is one track to one side of an aisle, for example an aisle between seats, and another track to the other side of the aisle. This doubles the light output in a very simple manner and defines a path in which the user may move. Alternatively only a single track may be provided.

Preferably there is one, or most preferably a pair, of branch tracks leading from an aisle track to an emergency door. Most preferably the emergency door, or the region of the doorway, is also marked (preferably bounded) by photoluminescent areas. Alternatively there may be no tracking in the region of the emergency door. The guide means in the region of the emergency door may comprise an electrical or other guide means.

The photoluminescent floor-level emergency exit lighting system may be provided as original equipment, or it may be retrofitted to existing aircraft.

According to a fifth aspect of the invention we provide a method of reducing the cost of maintaining an aircraft's emergency exit floor path lighting system comprising having a photoluminescent emergency exit floor path lighting system instead of an electrically powered system.

Thus the maintenance required may simply be cleaning.

According to a sixth aspect of the invention we provide a method of reducing the cost of maintaining an aircraft's emergency exit floor path lighting system comprising removing an existing electrically powered floor path system and replacing it with a photoluminescent system.

Preferably when the electrical system comprises a line of lights in a channel track we remove the lights, introduce a support member into the channel, and introduce a photoluminescent strip on top of the support member. Preferably a cover is applied over the strip and is secured to the existing channel track.

The photoluminescent strip may be attached to the carpet of the aircraft. Preferably the photolumninescent strip is attached to the carpet using ultrasonic welding, but may be attached using gluing or other method.

Preferably the photoluminescent strip is covered in a protective see-through material. Preferably the protective material is poly-carbonate, but may be any other suitable see through material, as appreciated by a man skilled in the art.

According to a seventh aspect of the invention we provide a method of reducing the cost of installing, or modifying the layout of, an aircraft's emergency exit floor path lighting system comprising securing the aircraft's emergency floor lighting system to the floor of the aircraft through the carpet on the floor (instead of cutting the carpet around the lighting).

This reduces the amount of cutting of the carpet that is required to match it to the floor path lighting system, which makes it quicker and cheaper to install the carpet. It also means that if the layout of the floor path lighting is changed the existing carpet can still be retained since it does not have great big holes in it at the old location of the lighting system.

It will be appreciated that the carpet extends under the floor path lighting system.

Preferably a backing member (e.g., a strip or plate) is secured to the floor of the aircraft where the lighting is to be positioned.

Preferably the carpet is laid on top of the backing member.

Preferably locating means is provided on the backing member to locate the lighting. The locating means may be holes or studs which co-operate with studs or holes, respectively, on the lighting.

Such a system has an advantage that cutting of the covering carpet is reduced, resulting in a lower wastage of the carpet, and making it quicker to replace the carpet, and thus the cost of refitting the aircraft is reduced.

The lighting may be provided with a means to temporarily attach it to the floor of the aircraft. The means may comprise Velcro™ (or the like) attached to the lighting strip or may comprise clamps secured at intervals to the cabin floor through holes in the carpet.

According to another aspect of the invention we provide a way of reducing the cost of fitting out an aircraft with floor-mounted emergency exit path lighting system comprising attaching the exit path lighting above the carpet of the aircraft. This may be achieved by studs entering through the carpet, or by Velcro™, or in any other way.

The aircraft's emergency exit floor path lighting system may be of the known electrical system or alternatively the emergency exit floor path lighting system may be of the photoluminescent type disclosed in this application.

In any of the inventions disclosed it will be appreciated that the photoluminescent strips may be substantially continuous elongate lines, or they may be interrupted. Or circles or discs of photoluminescent material spaced at intervals may be used as an alternative to strips of photoluminescent material.

We have also made an interesting discovery which is useful in photoluminescent emergency exit pathways, and more widely in photoluminescent signs or displays generally. Up until now if we wanted to have an arrow, or the word EXIT or other words or pictograms, in a photoluminescent sign, or in the exit path line, we can do it by applying an opaque layer above the photoluminescent material, masking out the emitted light. This leaves essentially lack markings on a light-emitting background (or vice-versa—we can blank out the background and let the markings glow in the dark).

We have now discovered that some dyes/stains/inks can, when applied over a photoluminescent layer, glow in the dark with a different color to that of the photoluminescent layer. Thus the sign can have both the background and the markings emitting light. This makes the markings easier to see, and means that more light, overall, is given off by the sign.

According to an eighth aspect of the invention we provide a photoluminescent sign or display comprising a photoluminescent layer of a first color, and markings of a second color overlying the photoluminescent layer, the markings being made with a dye or ink (or the like) that, in use, when overlaid, glows in the dark with a different color from that of the photoluminescent layer.

The color that the markings emit in the dark may not be the same color as they reflect in daylight.

The dye or ink may simply filter out some wavelengths of light emitted by the photoluminescent layer, allowing others to pass. Alternatively the dye or ink may be excited by the light emitted by the underlying photoluminescent material and may emit its own light as a response to that excitation.

The dye or ink may itself be photoluminescent with a different color light from that of the layer beneath it.

Preferably the base photoluminescent layer is yellow more specifically yellow/green. Preferably the pigment has a red color but may be another color. The pigment may be a dye, such as POLYVIN MATT FLUORESCENT RED PM 1256 which can be obtained from GIBBON inks and coatings of 25 Deer Park Road, Wimbledon.

The pigment may have incorporated in it a compound which is impervious to UV light. Blocking UV light may have the advantages disclosed hereinbefore.

According to a ninth aspect of the invention we provide a photoluminescent sign or markings having a photoluminescent layer and a dye, or other coloring, overlaid above the photoluminescent layer, the dye being such that photoluminescent light is transmitted through it, but with a changed wavelength spectrum to give a photoluminescent light of a different color to that of the photoluminescent layer.

Instead of transmitting some wavelengths of light emitted by the photoluminescent layer the dye could emit light of its own.

Preferably, the sign or markings has a first region in which the photoluminescent layer is overlaid by the dye which modifies the light emitted to produce light of a different color, and a second region in which the photoluminescent layer is not covered by the dye and emits light of its natural color.

There may be more than one layer of photoluminescent material provided with the dye, or other coloring, being provided between the different photoluminescent layers. An advantage of this is that the intensity of the light is increased but a different color portion is still provided.

Preferably the first or second regions define letters, or a word, or an information—giving graphic symbol.

The dye, or other coloring, may contain mixed Xylenes, 2-Butoxyethanol and Cyolohexanone as active ingredients.

The active ingredients may be provided in the proportions Xylenes <10%, 2-Butoxyethanol <5% and Cyolohexanone <15%.

According to a tenth aspect of the invention we provide a photoluminescent material or member which is also reflective.

Preferably the material or member is retro reflective.

The member or material may be provided in the form of a sheet of material.

Preferably a layer of reflective material is provided on top of a layer of photoluminescent material. An advantage of such a composite is that it will act as a light source and also reflect light, making it highly visible. Such a material may have uses in high visibility clothing, life boats, life belts, guidance out of buildings as well as for the emergency floor lighting of vehicles. Such items incorporating this material are explicitly disclosed and we may seek protection for the items per se.

Preferably the layer of reflective material is transparent in addition to being reflective. This may allow light emitted from the photoluminescent material to pass through the reflective layer.

Preferably the layer of reflective material is made from micro-prism reflective material.

Preferably the reflective layer is attached to the photoluminescent layer, using high frequency welding. Preferably the layers are welded together using a lattice work grid pattern. This pattern of welding may prevent the egress of dirt or water into cells created by the welding pattern. The presence of such dirt or water in the cells may prevent the photoluminescent material from working.

BRIEF DESCRIPTION OF THE DRAWINGS FIGURES

Embodiments of the invention will now be described by way of example only, with reference to the accompanying drawings of which.

DETAILED DESCRIPTION OF THE INVENTION

Figure 1:
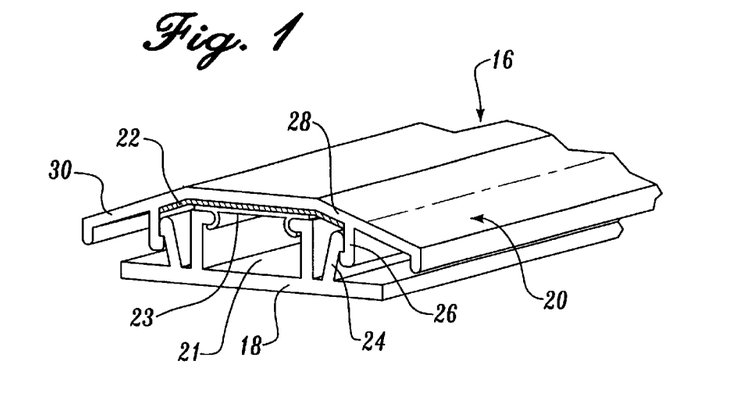
FIG. 1 shows a perspective view of a retro-fitted aircraft emergency exit floor path lighting track using existing track.
Figure 2:
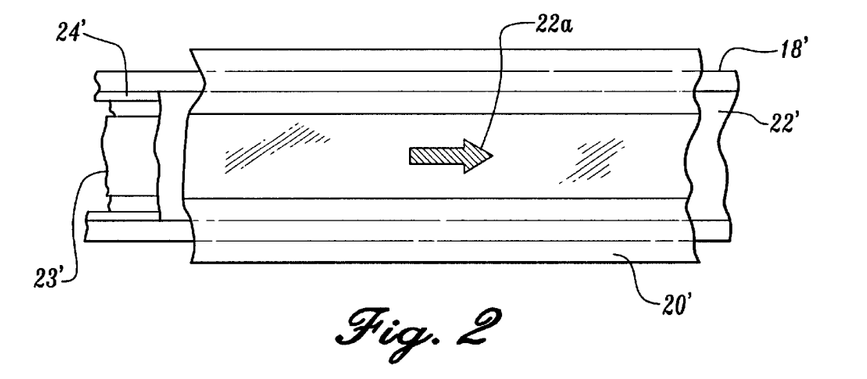
FIG. 2 shows a plan view of an original equipment aircraft exit floor path lighting track.
Figure 3:
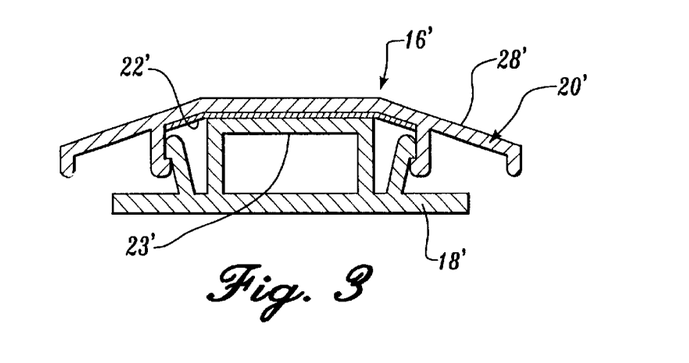
FIG. 3 is a cross-section of the track of FIG. 2.
Figure 4:
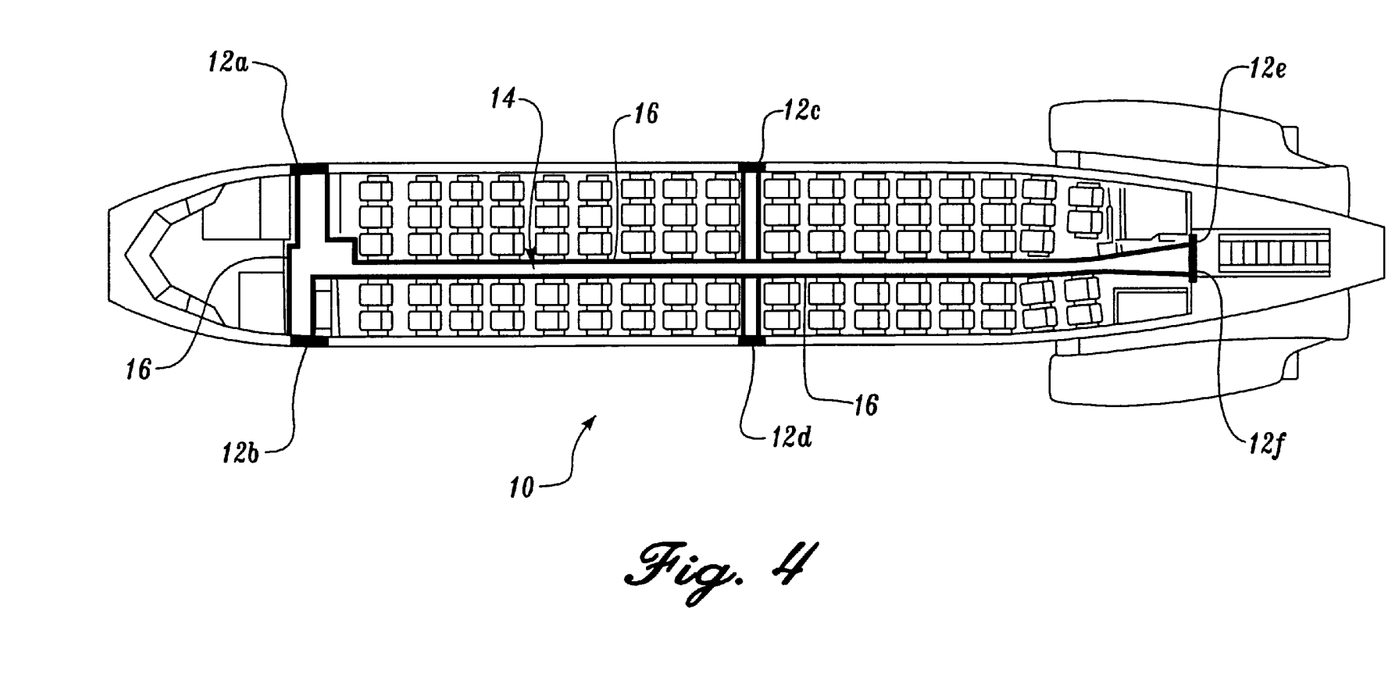
FIG. 4 shows the general arrangement of an emergency exit floor path lighting track in an aircraft.

A general view of a system in accordance with the invention is given in FIG. 4. This shows an aircraft 10 having emergency exits 12a, 12b, 12c, 12d, 12e, and 12f, and a floor mounted emergency exit pathway indicating system 14. The system 14 comprises a track 16 having a base member 18, a cover 20, and a photoluminescent strip 22 held between the cover and the base member. FIGS. 1 to 3 show this best. FIG. 4 shows that there are two tracks 16 associated with the aisle, and with each emergency exit route: one to either side of the floor path.

Referring to FIG. 1, this shows a molded plastics guide track 16 that has been retrofitted to an aircraft that originally had an electric emergency floor path lighting system. The original plastics material base section 18 is retained. In an electrical lighting system wires and lights are retained in a channel 21, but in the retrofitted photoluminescent system they have been removed and the top of the channel 21 has been closed by a plastics material support formation 23 which is releasably snap-fitted to hook formations at the top of the side walls of the channel 21. The photoluminescent strip 22 is a flexible strip of about a millimeter thick. It has a vinyl base which contains titanium dioxide or other whitening agent and has two thin-film layers of photoluminescent material—containing vinyl cast on top of the vinyl base. The photoluminescent material is overlaid by a UV protective top layer (not shown). The strip 22 has the following glow properties:

| Typical Glow Duration: | Initial | 1300 mcd/m$^2$ |
| --- | --- | --- |
| | 1 minute | 445 mcd/m$^2$ |
| | 10 min. | 30 mcd/m$^2$ |
| | 30 min. | 8 mcd/m$^2$ |
| | 60 min. | 3.8 mcd/m$^2$ |

The photoluminescent material emits a yellow light, tinged with green.

In a different embodiment a whitening agent other than titanium dioxide may be used.

The cover 20 is made of a transparent plastics material. The cover 20 releasably clips on to the base section via co-operating fingers 24 and 26 provided on the base section and cover respectively. The cover has ramped, or sloping portions 28 and 30 which make it easier to roll a trolley over the track, and reduce the chance of someone tripping over the track.

FIGS. 2 and 3 show a track that is similar to that of FIG. 1 except that instead of being retrofitted to an existing electrical track it is original equipment. Instead of having a separate support formation 21, the plastics material base section 18 of the embodiment of FIGS. 2 and 3 has a box-section support formation 21 integrally molded with it.

In a different embodiment the track of FIGS. 2 and 3 may be retro-fitted.

In both of the arrangements of FIG. 1 and FIGS. 2 and 3 the support formation supports the center of the cover 20, and the strip 22, so that they do not collapse when someone treads on them.

Figure 5:
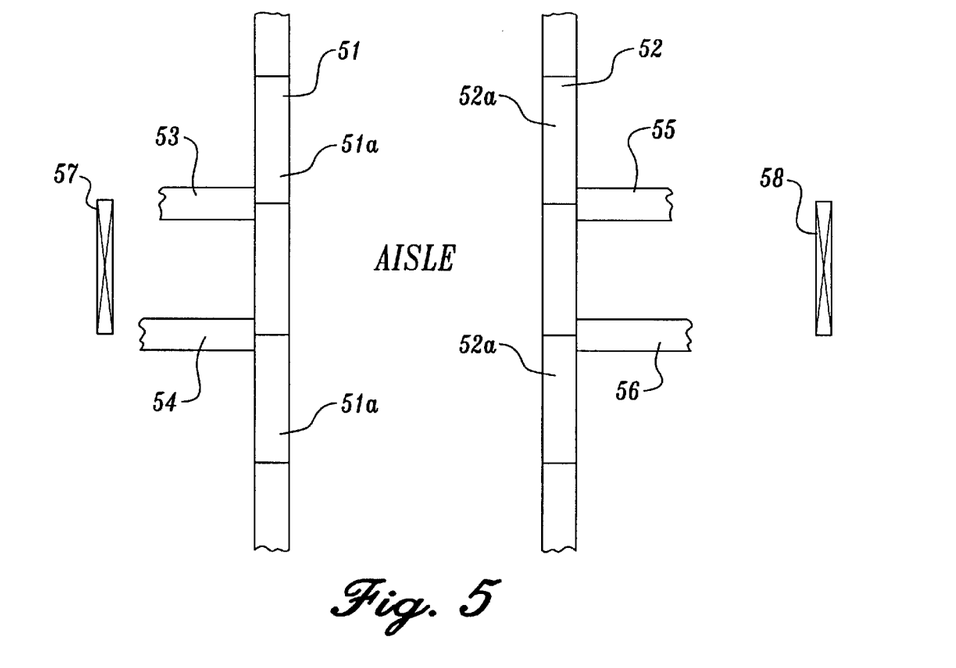
FIG. 5 shows detail of the track arrangement near an emergency exit.

FIG. 5 shows detail of the tracks 16 at the region of an emergency exit. The tracks referenced 51, 52, are the main aisle tracks extending longitudinally of the aircraft. Branch tracks 53, 54, 55, 56, extend, in pairs, to each emergency door, referenced as 57 and 58. This gives the passengers a lead right up to the emergency exit. It will also be noted from FIG. 4 that all of the aisles of the aircraft are bounded by photoluminescent track 16. This means that if a passenger follows a track 16 in any direction he will come to an emergency exit.

We may put arrows, or other indicia, in the track to indicate the direction to the nearest emergency exit. We may also put words in the track, for example "Emergency Exit".

It we do put markings on the photoluminescent tracks we prefer to make hem with the dye POLYVIN MATT FLUORESCENT RED PM 1256 or an quivalent colorant that also glows with light of its own color in the dark.

Figure 6:
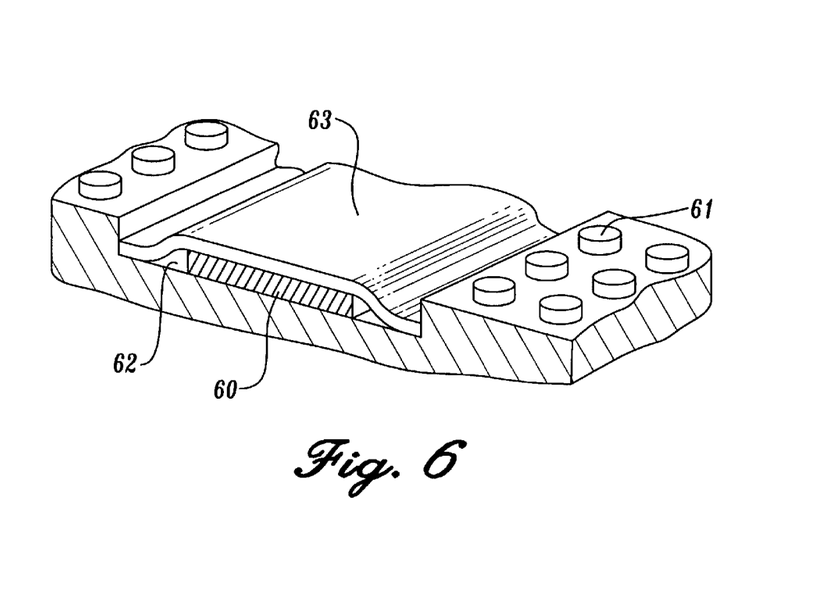
FIG. 6 shows detail of a track near a galley.

FIG. 6 shows another arrangement for installing a photoluminescent strip, referenced 60, in the flooring of an aircraft. The flooring is a non-slip lastics material flooring that has raised sections 61. These make it difficult to mount a strip to the flooring. We remove a channel of flooring, for example by abrading, or milling, possibly in situ in the aircraft, to produce a flat based channel 62. The strip 60 is laid in the channel and a transparent covering 63, for example an acetate strip, is glued over the photoluminescent strip 60. The channel 62 is wider than the strip 60 to give a surface area to which the cover 63 can be glued. The glue is also preferably transparent. In the embodiment shown in FIG. 6 the surface of the transparent cover strip 63 that overlays the photoluminescent strip 60 is at about the same height as the raised sections 61.

In a different embodiment the cover 63 may be of polycarbonate.

In a further embodiment the photoluminescent strip may be precut and vacuum sealed between two covering strips. A self adhesive may be applied to the bottom surface of one of the covering strips so that the complete assembly can be easily laid into a channel corresponding to channel 62 in the flooring of the aircraft.

Figure 7:
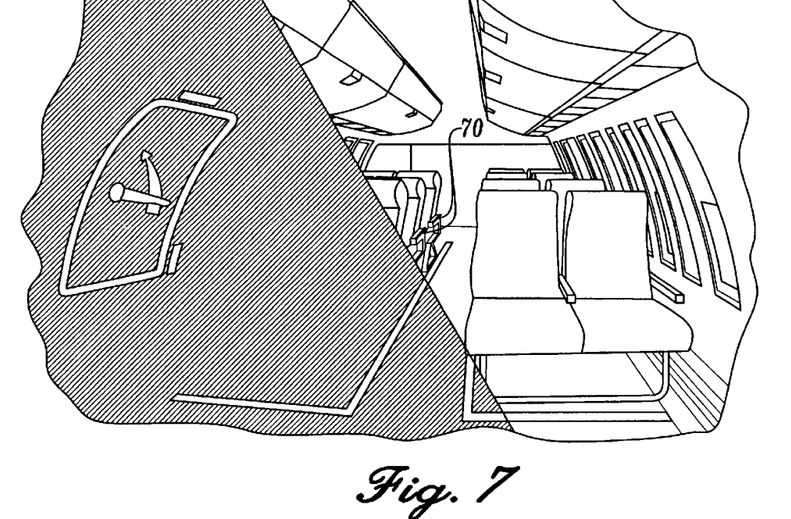
FIG. 7 shows an impression of what an aircraft emergency exit floor path system according to the invention will look like in use.

FIG. 7 has a right hand portion showing the interior of an aircraft and floor-mounted photoluminescent guide tracks, with the lights of the aircraft on, and a left-hand portion showing what a passenger would see with the lights off. A clear path between the parallel photoluminescent tracks of the aisle, and the emergency exit gangways, is defined and illuminated, for the passenger to escape. The photoluminescence of the pair of tracks is bright enough, at floor level, for reading.

Figure 8:
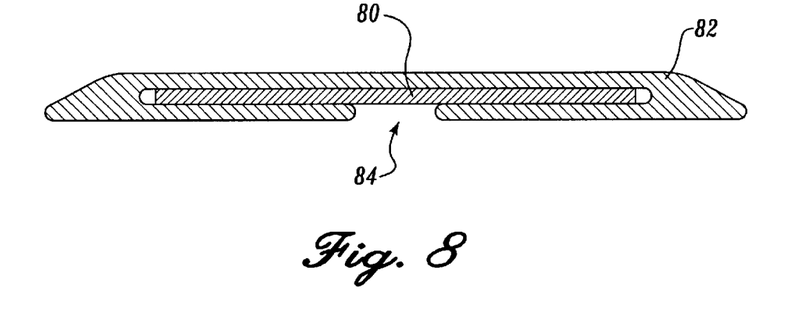
FIG. 8 is a cross section of a further embodiment of the lighting track.

FIG. 8 shows a further embodiment for mounting the photoluminescent strip 80. The housing 82 is low profile, presenting a minimum obstruction for trolleys and the like. The housing 82 has the dimensions: height 3.0 mm, and width 43 mm.

The strip 80 is removable from the housing 82. The gap 84 in the lower portion of the housing 82 facilitating the removal of the strip 80.

Some detailed features of possible alternative systems which are not shown in the drawings and/or described in detail above are:

A method of joining tracking together is preferred not to be, continuous runs of strip. This is preferably not used because a) it is unwieldy, and b) on impact it may drag away from the fuselage.

Instead we prefer to use short runs. We use 2 m lengths placed butt to butt, with the top cover of one slightly overlapping the base section of the next. We could seal using a small strip clip over the joint of the adjacent butting sections, but at present we do not find it necessary.

We have developed and do intend to use end-caps. These are placed at the beginning and end of track runs. We could use the end caps between the 2 meter runs, but this would break the concept of continuous cueing. This may be acceptable.

For right-angle joins as in cross-aisle, we just put the track against each other. Proper mitering of the joint into right angles or T-junctions could be performed if appropriate.

One way of attaching the lighting strips to the aircraft floor is to ultrasonically weld the PLM tracking into carpeting. The results of our secret tests so far have been successful. This invention would include welding in the strips as they are shown in the drawings, and alternatively welding strips covered or sealed in polycarbonate or other protective see-through material. Instead of welding we may prefer to glue or otherwise inserting or attaching photoluminescent material to the floor covering.

Another variation of this theme is that we may "black" (make opaque) the flange or edge performs of the otherwise transparent top cover to cover up poor cutting of the carpet/floor covering. Furthermore changing the color of the light given off by either coloring the top cover by inserting pigment into the plastic mix or by inserting a colored filter member between the PLM and the top cover or by putting the pigment or filter in the UV protective layer or below the UV protective layer of the PLM is possible.

As discussed in the introduction, we have developed yet another concept for the utilization of the floor mounted emergency exit path strips. A major cost in putting in lighting strips is the cost and wastage associated with cutting up the aircraft carpet/floor covering. This means that the carpet is thrown away each time there is a change of layout. Consequently we have invented the idea of a system which does not require the carpet to be cut. A backing plate is secured to the floor of the cabin where the tracking is required to run. This plate either has locator holes or studs, it can work either way, along its length. The carpet is laid on top of it -and the photoluminescent tracking (it will have to be a lower profile than the present one) is married up and pressed home attaching to the backing plate. Although the attachment could work male to female, or female to male, we feel that the studs should be on the back plate as it would be far easier to locate.

This concept of a backing member beneath the carpet to which floor path lighting is secured, through the carpet that is between them, also applies to standard electrical floor lighting.

In addition we feel that as an alternative we may provide a quick release/no damage to the carpet system. This might include some sort of Velcro concept for surface mount, or additionally or alternatively clamps for the lighting system secured at regular intervals on the cabin floor. The clamps might be cut into the carpet, and when PLM is used would secure the PLM strip.

We have also invented a method of combining reflective material with PLM vinyl such that the PLM beneath absorbs light through the surface mounted reflective material whilst shining through the reflective material to give off light. This combination is a great break through as it is unique to be both reflective as well as PLM charged. Its uses will be for high visibility clothing, lifeboats, lift belts, and for signs in general. It will also be useful on way guidance in buildings as well as vehicles such as cars and lorries.

It will be appreciated that we could mount the photoluminescent safety strips on the seats (e.g. the sides of the seats, with or without breaks in the PL material). We could mount the strips on the legs of the seats. Seat side mounting has the advantage that we do not have to cut the carpet to install the system, or to recognize the layout of the P1 safety strips within the aircraft.

We could clip the strips to the seat/carpet, use studs (or releasable mechanical fasteners) use hook and fiber fasteners (Velcro™). We could weld the strips to the carpet and/or seat sides. We could glue the strips down.

What is claimed is:

1. An aircraft comprising:
   (a) a floor along which is disposed an aisle having:
      (i) a length and a width;
      (ii) a first side region extending longitudinally adjacent to a plurality of seats that are spaced apart longitudinally along said aisle; and
      (iii) a second side region spaced apart from said first side region by substantially the width of said aisle;
   (b) an exit adapted to enable passengers to leave the aircraft;
   (c) a first elongate guide track mounted on said floor and extending longitudinally along said first side region of said aisle;
   (d) a second elongate guide track mounted on said floor and extending longitudinally along said second side region of said aisle;
   (e) each of said first and second guide tracks having a generally flat, smooth top surface and comprising a plurality of track sections having a length and a width, and being butted end-to-end along the guide track;
   (f) each of said plurality of track sections comprising:
      (i) a photoluminescent strip extending substantially continuously along the track section and having an upper surface and a lower surface; and
      (ii) a cover of light transmissive material extending continuously over said photoluminescent strip to protect said upper surface; and
   (g) said photoluminescent strip being energized by an ambient light source and operable to emit visible light for a substantial period of time in an absence of said ambient light source and without being energized by an electrical current, so that said first and second guide tracks provide substantially parallel continuous tracks of light extending longitudinally along said aisle to identify said side regions of said aisle and to define a path along said aisle of the aircraft in an absence of illumination from said ambient light source, for guiding passengers along said aisle toward the exit.

2. The aircraft of claim 1, wherein each of said plurality of track sections further comprises a base extending along said photoluminescent strip to support said lower surface.

3. The aircraft of claim 2, wherein said photoluminescent strip is held substantially between opposed, generally parallel surfaces of said cover and said base.

4. The aircraft of claim 2, wherein said cover is releasably attached to said base.

5. The aircraft of claim 4, wherein said base and said cover have respective co-operating interengageable formations extending substantially continuously along each side of each track section.

6. The aircraft of claim 5, wherein said co-operating interengageable formations comprise downwardly projecting flanges on said cover and upwardly projecting flanges on said base.

7. The aircraft of claim 2, wherein said cover and said base are formed integrally.

8. The aircraft of claim 1, wherein said photoluminescent strip includes a layer of photoluminescent material.

9. The aircraft of claim 8, wherein said photoluminescent material emits one of a yellow and a yellow-green light.

10. The aircraft of claim 8, wherein said layer of photoluminescent material overlies a reflective layer.

11. The aircraft of claim 1, wherein said cover has laterally projecting side edge flanges extending longitudinally along said track section to overlie flooring material on each side of each of the first and the second guide tracks.

12. The aircraft of claim 11, wherein said side edge flanges are inclined downwardly relative to said top surface of each of the first and the second guide tracks.

13. The aircraft of claim 11, further comprising a plurality of seats disposed adjacent to said second side region of said aisle and spaced apart longitudinally along said aisle.

14. The aircraft of claim 1, wherein said exit is offset to one side of said aisle from said first guide track, and wherein a pair of exit guide tracks extend from said first guide track to said exit to identify an exit aisle branching toward said exit.

15. The aircraft of claim 1, wherein said first and second guide tracks include direction indicators leading to said exit.

16. The aircraft of claim 1, wherein said first and second guide tracks are non-directional.

17. The aircraft of claim 1, wherein said photoluminescent strip comprises a material having a photoluminescent glow property such that from a time when said ambient light source was last incident thereon, the photoluminescent strip has a light output of at least 445 mcd/m$^2$ after one minute, at least 30 mcd/m$^2$ after ten minutes, at least 8 mcd/m$^2$ after thirty minutes, and at least 3.8 mcd/m$^2$ after sixty minutes.

18. The aircraft according to claim 1, further comprising a pair of spaced-apart, parallel exit guide strips extending from one side region of said aisle to the exit, said exit being disposed adjacent to and offset from said aisle, each of said exit guide strips comprising at least one track section and having:
(a) a generally flat smooth top surface;
(b) a photoluminescent strip extending substantially continuously along said track section of the exit guide strip and having an upper surface and a lower surface; and
(c) a cover of light transmissive material extending continuously over said photoluminescent strip of the track section of the exit guide strip to protect said upper surface, said photoluminescent strip being energized by the ambient light source and being operable to emit visible light for a substantial period of time in the absence of illumination from said ambient light source and without being energized by an electrical current, so that said pair of exit guide strips provide substantially parallel continuous tracks of light extending from said aisle to said exit in the absence of the illumination from said ambient light source, for guiding passenger from said aisle towards said exit.

19. The aircraft according to claim 18, further comprising photoluminescent areas marking the exit and operable to emit light photoluminescently in the absence of the illumination from the ambient light source.

20. An aircraft emergency exit guide track adapted to illuminate an escape route along an aisle extending longitudinally along a floor of the aircraft between rows of seats, said guide track having a substantial elongate length, a substantial width transverse to said elongate length, and a plan area, said aircraft emergency exit guide track comprising:
(a) a plurality of track sections butted end-to-end to form a continuous light path, each track section comprising:
(i) an elongate base strip adapted to be secured to the floor of the aircraft;
(ii) an elongate cover that is one of transparent and translucent and extends over said base strip, said elongate cover having a substantially planar, smooth top surface;
(iii) an elongate photolumninescent strip disposed between said base strip and said elongate cover and occupying substantially all of said plan area;
(b) said elongate cover overlying and protecting said photoluminescent strip and said base strip supporting said photoluminescent strip and enabling said track section to be trodden upon without damaging said photoluminescent strip;
(c) said cover being releasably attached to the track section along each side of said track section, enabling the cover to be readily removable therefrom and replaceable; and
(d) said photoluminescent strip being activated by exposure to an ambient light source and being operable to automatically emit light photoluminescently for a substantial period of time in an absence of illumination from the ambient light source, without further activation.

21. A method for defining an escape path between rows of seats arranged on each side of an aisle extending longitudinally of an aircraft cabin, comprising the steps of:
(a) providing a plurality of elongate track sections that are operable when activated by an ambient light source, to emit visible light photoluminescently for a substantial period of time in an absence of illumination from the ambient light source; and
(b) securing said track sections end-to-end to a floor of the aircraft cabin to provide an elongate guide track extending longitudinally along each side of said aisle adjacent to said rows of seats so that light emitted by the elongate track sections defines a substantially continuous path of light along said aisle.

* * * * *